United States Patent Office 3,203,874
Patented Aug. 31, 1965

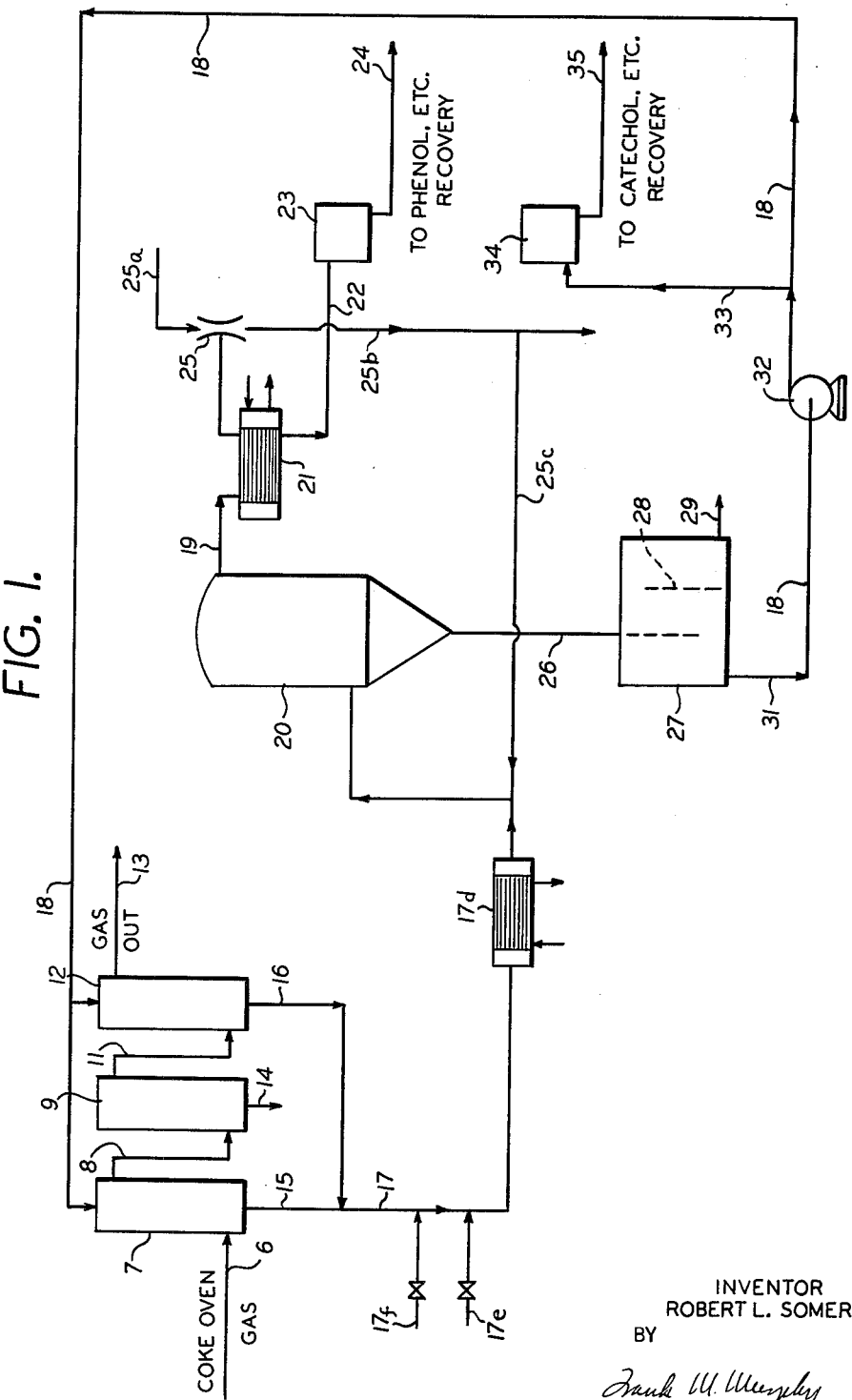

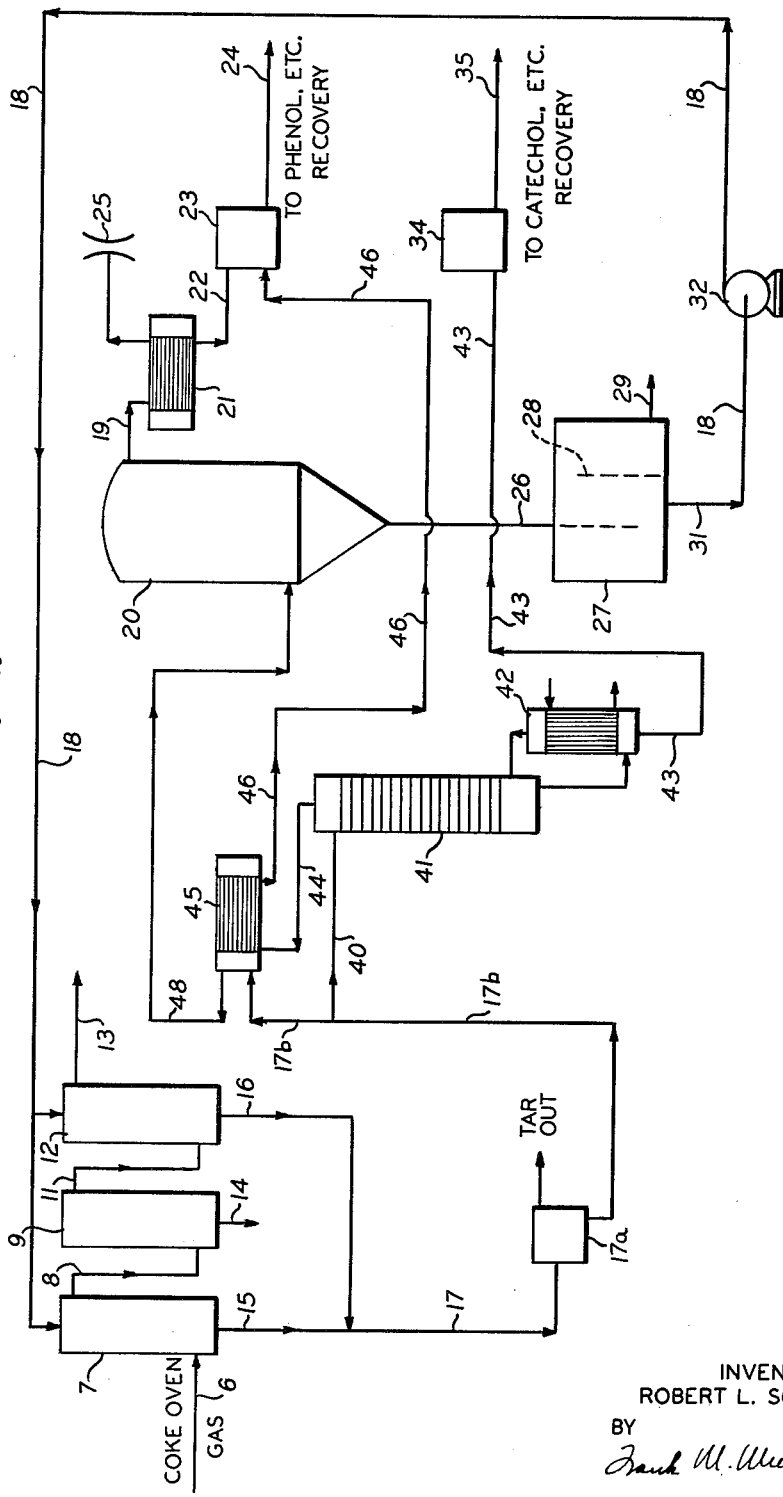

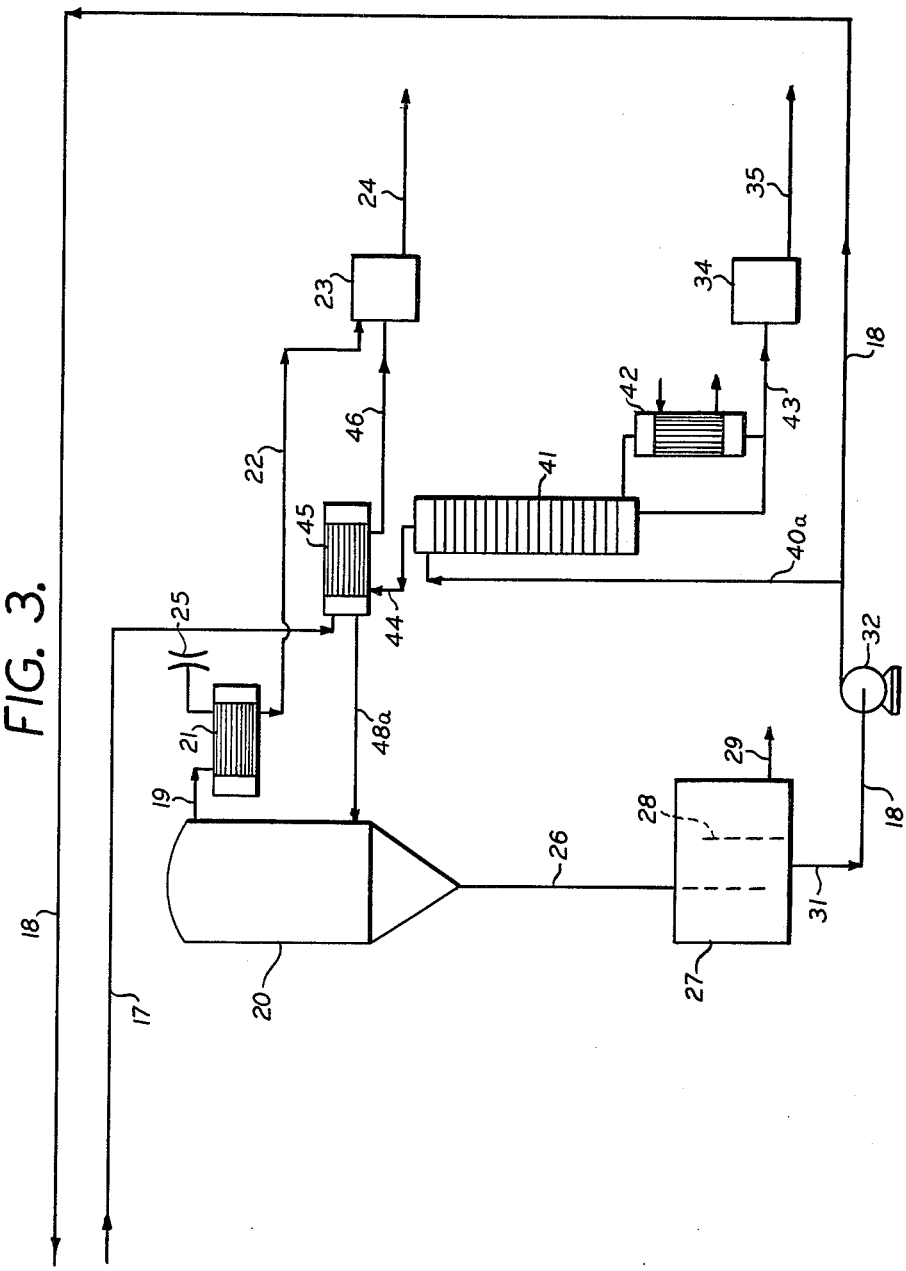

3,203,874
RECOVERY OF VALUES FROM COKE OVEN
LIKE GASES
Robert L. Somerville, R.R. 1, Box 256,
Neshanic Station, N.J.
Filed July 6, 1962, Ser. No. 208,143
13 Claims. (Cl. 202—52)

This invention relates to recovery of values from coke oven like gas, and is particularly directed towards providing for economic recovery of a phenol fraction and a dihydroxybenzene fraction from coke oven gas.

Coke oven gas is known to contain values of the type referred to and many processes for recovering these values have been proposed. A number of these processes have been tried. Commonly they involve as a first step scrubbing the gas with water to take up in the water the phenolic fraction and the dihydroxybenzene fraction and employ different procedures for treatment of the aqueous liquid resulting from the washing to obtain therefrom the phenolic fraction and the dihydroxybenzene fraction. Notable among these liquor treatment procedures is a solvent extraction process which is used commercially. In this procedure, an extract is obtained which contains the phenolic fraction and the dihydroxybenzene fraction.

Of interest with respect to the problem of recovering the values, is a commercial practice wherein the values are disposed of but are not recovered for use. In this process, the liquor from the washing step is passed through a spray pond. Upon spraying, the phenolic fraction is evolved as a gas, and the compounds making up the dihydroxybenzene fraction are oxidized to tars. While this procedure does not permit recovery of the values, it does condition the liquor for recycle to the washing step.

The principal object of the invention is to provide a highly efficient procedure for recovery of the values. Other objects will be apparent from the ensuing description of the invention.

Broadly considered, the invention involves utilizing the conventional washing step wherein hot coke oven gas is scrubbed with water, and then treating the liquor formed in the scrubbing zone in a novel manner. Thus, the liquor from the scrubbing zone is subjected to vacuum distillation to separate a phenolic fraction and is thereafter returned to the scrubbing zone. Treatment in this manner involves the advantage that heat picked up by the liquor as a consequence of contacting with coke oven gas in the scrubbing zone, is utilized in the vacuum distillation to separate out as vapor the phenolic fraction. The dihydroxy benzene fraction is obtained by withdrawing a sidestream from the liquor circulated between the scrubbing zone and the vacuum distillation zone, and this sidestream can be treated to recover therefrom the dihydroxybenzene fraction values.

In a preferred embodiment of the invention, the sidestream withdrawn for recovery of the dihydroxybenzene fraction is subjected to fractional distillation to provide a bottoms of the fractional distillation containing the dihydroxybenzene fraction, and an overhead rich in phenol values. This overhead is an aqueous phenol cut which can be combined with the product of vacuum distillation as another phenol cut, to provide the phenol fraction.

In the practice of the preferred embodiment wherein fractional distillation is employed as aforesaid, it has been found highly advantageous to bring the liquor fed to the vacuum distillation zone into indirect heat exchange relation with the overhead from the fractional distillation, to, on the one hand cool and condense the overhead, and, on the other hand, to impart to the liquor heat in addition to that picked up in the scrubbing zone, for utilization in the vacuum distillation zone.

The invention is further described in reference to the accompanying drawings, of which:

FIGS. 1–3 are flow diagrams representing embodiments of the process of the invention. In these figures, like reference characters refer to corresponding parts.

Referring to FIG. 1, hot coke oven gas from, for example, a lignite coking operation passes through line 6 to scrubber 7, thence through line 8 to tar remover 9, on through line 11 to another scrubber 12, and from scrubber 12 through line 13 for further processing (not shown). The scrubbers are fed with aqueous liquor from line 18, and the liquor and hot gas are contacted in the scrubber so that a phenol fraction and a dihydroxybenzene fraction is taken up by the liquor. The liquor rich with these fractions is withdrawn from the scrubbers through lines 15 and 16 and is combined in line 17. The effluent from the tar washer leaves the tar washer through line 14 and is passed to further processing (not shown).

The warm liquor withdrawn from the scrubbers and passed through line 17 is circulated and introduced into line 18 and returned to the scrubbers. Before the liquor is returned, and while still warm, it is introduced into the vacuum distillation vessel 20, wherein it is subjected to vacuum distillation to separate therefrom the phenol fraction. In the vacuum distillation zone in the vessel 20, flash evaporation occurs and the evolved phenol fraction leaves the vessel via line 19, which conveys the evolved vapor to condenser 21. A jet ejector 25 is connected to the condenser 21 and serves to maintain the desired vacuum in the vacuum distillation vessel. Cooling water is circulated through the condenser 21 and condenses the phenol fraction, the cooling water also serving to maintain the vacuum. The condensate from condenser 21 passes through line 22 to collecting vessel 23 which serves as a hold up tank for the phenol fraction. From this vessel, the phenol fraction can be passed through line 24 to further processing (not shown) for working up of the phenol fraction.

The liquor remaining from the flash evaporation in the vacuum distillation zone passes through barometric leg 26 of the vessel 20 to tank 27 wherein a seal is maintained and a weir 28 is utilized to effect a removal of tars. The tars overflow the weir 28 and leave vessel 27 through line 29. The liquor leaves vessel 27 via line 31, is pumped by pump 32 into line 18 which conveys the liquor back to the scrubbers 7, 12.

Also before return of the liquor to the scrubbing zones maintained in scrubbers 7, 12, a portion of the liquor is separated as a sidestream and is conveyed in line 33 to hold up vessel 34. This portion of the liquor is the dihydroxybenzene fraction, and can be passed by line 35 to further processing (not shown) for working up to provide products such as catechol. From the foregoing description, it will be apparent that heat from the coke oven gas imparted to the liquor in the scrubbing zones is utilized for distillation in the vacuum distillation zone. This permits highly efficient operation of the recovery system.

If desired, instead of withdrawing the sidestream which provides the dihydroxybenzene fraction, from the liquor effluent of the vacuum distillation column, the said sidestream could be withdrawn from the liquor feed to the vacuum distillation column. In operation as is depicted in FIG. 1, however, the preferred procedure is to withdraw the dihydroxybenzene fraction sidestream from the vacuum distillation effluent, as is shown in FIG. 1.

In the operation of the process, water is picked up by the liquor in the scrubbing zone and the liquor is aqueous. Also the phenolic fraction and the dihydroxybenzene fractions, as recovered in the process, are both contained in aqueous medium as the overhead from the vacuum distillation is a mixture of water vapor and the phenolic materials and the liquor from which the dihydroxybenzene fraction is withdrawn is aqueous. Depending on the operating conditions, some addition of water beyond that derived from the coke oven gas in the scrubbers, may be necessary. Referring to FIG. 1, this can be added via line 17e.

Further, whereas the principal or total amount of heat necessary for the vacuum distillation can be obtained from the scrubbing operation, yet, usually, and particularly for good operating efficiency, further addition of heat is desirable. This can be provided by passing the scrubber effluent liquor through heat exchanger 17d.

In a preferred embodiment of the invention, exhaust steam from steam jet ejector 25 can be utilized to add water and also heat to the system. Thus, steam can be fed to the ejector via line 25a and can exhaust from the ejector via line 25b. All or part of this steam can be diverted via line 25c to the liquor fed to the vacuum distillation vessel 20 and introduced directly into the liquor.

Whereas the liquor effluent from the scrubbers will normally be alkaline, yet a higher pH than that normally existing may be desirable. To adjust the pH upwardly, a suitable alkaline material such as ammonia can be added to the liquor via line 17f.

In the embodiment shown in FIG. 2, fractional distillation is employed to obtain the dihydroxybenzene fraction, and the phenol fraction is taken as a first cut obtained by vacuum distillation and a second cut obtained as the overhead from the fractional distillation. As in the case of the embodiment of FIG. 1, the various fractions are aqueous.

Liquor withdrawn from the scrubbers 7, 12, through line 17, is passed through a tar separator 17a. From the tar separators, the liquor flows through line 17b and on to vacuum distillation vessel 20. A sidestream 40 is withdrawn from the liquor in line 17b, and is passed to fractional distillation column 41, where, by fractional distillation employing heat supplied to reboiler 42, a dihydroxybenzene fraction is obtained as the bottoms of the fractional distillation, and is passed through line 43 to the collecting vessel 34 for the dihydroxybenzene fraction. The overhead from the fractional distillation passes through line 44 to condenser 45 where it is condensed and provides a second phenol cut. The condensate is passed via line 46 to hold-up vessel 23 for the phenolic fraction. The liquor remaining after separation of sidestream 40, passes to the vacuum distillation vessel 20 and is distilled to provide a first phenol cut which is combined with the second phenol cut in the hold-up vessel 23 for the phenol fraction.

In the operation of the process as represented in FIG. 2, it is highly advantageous to bring the liquor fed to the vacuum distillation zone in vacuum distillation vessel 20, into indirect heat exchange relation with at least one of the fractional distillation products obtained from the fractionator 41. In this way, the liquor while substantially retaining the heat picked up in the scrubbing performed in scrubbers 7, 12, is further heated, and the heat is utilized for the distillation in the vacuum distillation zone. Preferably this heat interchange is with the overhead from the fractionator 41. Thus, as shown in FIG. 2, liquor in line 17b is passed through the condenser 45 for indirect heat exchange and cooling of the overhead, whereupon the said liquor picks up heat. The heated liquor passes through line 48 to vacuum distillation vessel 20.

Whereas in FIG. 2, the sidestream for delivery to the fractionation column is withdrawn from the feed to the vacuum distillation vessel 20, if desired, the sidestream can be withdrawn from the effluent from the vacuum distillation vessel 20. Such operation is depicted in FIG. 3. The effluent from the vacuum distillation vessel 20 passes through barometric leg 26, to tar separator 27, leaves the tar separator through line 31 which conveys the liquor to line 18. From line 18, a sidestream is withdrawn through line 40a and passed through the fractionation column 41. As is the case of the embodiment shown in FIG. 2, in the FIG. 3 embodiment, the overhead from the fractionation column is brought into indirect heat exchange relationship with the feed to the vacuum distillation vessel 20, so as to provide further heat for the vacuum distillation.

In the embodiments of FIGS. 2 and 3, further heat, water, and pH adjusting material can be added to the liquor as has been described with reference to FIG. 1.

In the various embodiments represented in the drawings, the scrubbing operation can be conventional. The coke oven gas subjected to scrubbing, can be at a temperature of 400–1000° C. and is preferably at a temperature of 600–800° C. The liquor fed to the scrubber can be and preferably is at a temperature of 20–50° C. The temperature of the liquor leaving the scrubbing zone and containing the desired fractions, can be 40–80° C., and is preferably 30–60° C. The scrubbing can be carried out at atmospheric pressure.

The pH of the liquor cycled between the scrubbing zone and the vacuum distillation zone is greater than about 7 and is preferably greater than about 8.5. There is no critical upper limit of pH. A good range is about 8.5–9. A pH for the liquor as mentioned here is important to the obtaining of a good separation in the vacuum distillation zone, and in the fractional distillation, and accordingly such pH for the feed to these operations is desirable. The pH of the liquor can be adjusted by addition of ammonia.

The vacuum distillation operation is a flash evaporation wherein the feed to the vacuum distillation zone is, upon entrance into this zone, subjected to a substantially reduced pressure. The pressure can be 60–250 mm. of mercury, and is preferably 100–200 mm. of mercury. For these pressures, the temperature of the vacuum distillation zone liquor, will be, respectively 40–70° C., and 50–70° C. The effluent liquor is substantially an equilibrium mixture at the conditions employed.

The amount of liquor withdrawn as a sidestream for the dihydroxybenzene fraction can be about 0.5–5 weight percent of the liquor recycled and introduced into the scrubbers 7, 12. While lesser or larger amounts can be withdrawn, the range mentioned will normally be preferred. Where fractional distillation is employed to provide the dihydroxybenzene fraction, the amount of the sidestream withdrawn and subjected to vacuum distillation can be a like amount. The concentration of the dihydroxybenzene fractions in the liquor from the scrubbers can be about 3–60 grams per liter. The fractional distillation can be operated at atmospheric pressure to provide an overhead vapor at about 94–100° C. This overhead can be subjected to indirect heat exchange with the liquor fed to the vacuum distillation vessel, to heat the feed to the vacuum distillation vessel.

The phenol fraction contains phenol, orthocresol, metacresol, para-cresol, xylenols and higher alkyl phenols such as ethyl phenols. The dihydroxybenzene fraction contains catechol, homo-catechol, isohomo-catechol, resorcinol, methyl resorcinols, and higher alkyl dihydroxybenzenes.

Any coke oven gas such as is derived from production of charcoal or the coking of lignite can be employed. The process of the invention is particularly effective when used in treating gas evolved in the coking of lignite.

The coke oven gases contain ammonia and organic bases, and also $CO_2$, $H_2S$, $SO_2$ and organic acids such as formic, acetic, propionic, and aromatic acids. The bases appear in the phenolic fraction whereas the organic acids appear in the dihydroxybenzene fractions. The phenolic fraction can contain about 2–8% of the phenol compounds (monohydroxybenzene compounds) and the pH of this fraction can be about 6.5–9.5. The dihydroxybenzene compounds in the recirculating liquor can be about 3-60 grams per liter. This is a concentration desirable for recovery by, for example, extraction with an organic solvent.

Working up of the fractions obtained by the method of the invention to provide the values therein in pure form can be done by conventional means.

The phenolic fraction can be acidified with sulfuric acid to a pH of 2-4.5, and then solvent extracted in a multi-stage column (e.g. 20-25 stages) with isopropyl ether. The ether phase will contain the phenolic fraction compounds. The ether can be distilled over to provide a crude concentrate of the phenols or the phenols can be separated by re-extraction with an aqueous alkali hydroxide solution from which the phenolic compounds can be extracted by known means.

This crude concentrate can be separated into the various phenol compounds by vacuum fractional distillation. The compounds can be purified by crystallization from a suitable solvent such as trichloroethylene. Other solvents, which can be used in place of the isopropyl ether are other ethers, esters, hydrocarbons, trialkyl or triarylphosphates, butyl or secondary butyl acetate, benzene, toluene, or tricresyl phosphate.

The dihydroxybenzene fraction can be treated in the same way. The aqueous liquor can be acidified to pH less than about 3.5 and then extracted with isopropyl ether. The extract can be worked up to provide the values thereof in well known ways. The principal dihydroxybenzene is catechol (pyrocatechol or 2 hydroxy phenol).

The invention is further described in the following example.

*Example*

In a plant as is depicted in FIG. 2, 500 g.p.m. of liquor at 40° C. is contacted with lignite coking gas at an initial temperature of 750° C. and about atmospheric pressure, in a scrubbing zone. The effluent liquor from the scrubbing zone is at 60° C., pH 9.2, and contains after continuous recirculation phenols and dihydroxyphenols in about the following percentages:

| | Weight, percent |
|---|---|
| Phenol compounds | 4.5-6.5 |
| Dihydroxybenzene compounds | 4.0-5.5 |

A sidestream in amount of 15 g.p.m. of the scrubbing zone effluent, is fractionated in a fractional distillation column operated at atmospheric pressure to separate therefrom a bottoms as an aqueous liquor at about 100° C. and containing phenols and dihydroxybenzene in amount of 5 g.p.m. and about the following composition:

| | Weight, percent |
|---|---|
| Phenol compounds | 2.5-3.5 |
| Catechol | 7-9 |
| Other dihydroxybenzene compounds | 5-7 |

This is the dihydroxybenzene fraction.

The overhead of the fractional distillation is of about the following composition:

| | Weight, percent |
|---|---|
| Phenol compounds | 4.5-7 |
| Dihydroxybenzene compounds | 0.1 |

This overhead, which is about 100° C., is condensed by indirect heat exchange with the liquor remaining after separation of the sidestream and 10 g.p.m. of condensate is obtained. This condensate is a phenol cut. In the heat exchange the liquor used for cooling is heated about 10° C. The heated liquor is introduced into a vacuum distillation unit.

The vacuum distillation unit can be similar to the flash section of a conventional forced circulation vacuum evaporator. Vacuum distillation is conducted at 100 mm. of Hg vacuum and the temperature of the effluent from the vacuum distillation is about 45° C. The composition of the vapor evolved is about:

| | Weight, percent |
|---|---|
| Phenol compounds | 4.5-6 |
| Dihydroxybenzene compounds | 0.01 |

This vapor is condensed to provide 35 g.p.m. of a liquid which is a phenol cut. The phenol cuts are combined and provide the phenol fraction of the process.

The effluent from the vacuum distillation is substantially an equilibrium mixture so that the phenol content thereof would not change by more than about 0.1% if the liquor were exposed to the vacuum distillation zone condition for a prolonged time.

The vacuum distillation zone effluent is recirculated to the scrubbing zone.

While the invention has been described with reference to particular embodiments thereof, various modifications will occur to those skilled in the art and it is desired to secure by these Letters Patent all such modifications as are within the scope of the appended claims.

What is claimed is:

1. The process of recovering a phenol fraction and a dihydroxybenzene fraction from coke oven gas which comprises:
    (a) contacting hot coke oven gas containing a phenol fraction and a dihydroxybenzene fraction with water in a scrubbing zone to form a warm aqueous liquor containing said fractions,
    (b) withdrawing the warm liquor from the scrubbing zone,
    (c) introducing the liquor while warm into a vacuum distillation zone to separate therefrom the phenol fraction, as a vapor phase whereby heat from the coke oven gas imparted to the liquor in the scrubbing zone is utilized for the distillation in the vacuum distillation zone,
    (d) and separating from the liquor a portion thereof as the dihydroxybenzene fraction,
    (e) returning the liquor to the scrubbing zone.

2. A process of recovering a phenol fraction and a dihydroxybenzene fraction from coke oven gas which comprises:
    (a) contacting hot coke oven gas containing a phenol fraction and a dihydroxybenzene fraction with water in a scrubbing zone to form a warm aqueous liquor containing said fractions,
    (b) withdrawing the warm liquor from the scrubbing zone,
    (c) introducing the warm liquor into a vacuum distillation zone to separate therefrom the phenol fraction,
    (d) separating a portion of the vacuum distilled liquor as the dihydroxybenzene fraction, and
    (e) recycling the liquor remaining after separation of the dihydroxybenzene fraction to the scrubbing zone, whereby heat from the coke oven gas imparted to the liquor in the scrubbing zone is utilized for the distillation in the vacuum distillation zone.

3. The process of recovering a phenol fraction and a dihydroxybenzene fraction from coke oven gas which comprises:
    (a) contacting hot coke oven gas containing a phenol fraction and a dihydroxybenzene fraction with water in a scrubbing zone to form warm aqueous liquor containing said fraction,
    (b) withdrawing the warm liquor from the scrubbing zone,
    (c) introducing the liquor while warm into a vacuum distillation zone to separate therefrom a first phenol cut, whereby heat from the coke oven gas imparted to the liquor in the scrubbing zone is utilized for the distillation in the vacuum distillation zone,
    (d) separating from the liquor a sidestream,
    (e) fractionally distilling said sidestream to provide the dihydroxybenzene fraction as bottoms of the fractional distillation and a second phenol cut as overhead of the fractional distillation, and utilizing said first and second phenol cuts as the phenol fraction, and (f) returning the liquor to the scrubbing zone.

4. The method of claim 3, wherein said sidestream is withdrawn from the liquor fed to the vacuum distillation zone.

5. The method of claim 3, wherein said sidestream is withdrawn from the liquor effluent of said vacuum distillation zone.

6. The process of recovering a phenol fraction and a dihydroxybenzene fraction from coke oven gas which comprises:

(a) contacting the hot coke oven gas containing a phenol fraction and a dihydroxybenzene fraction with water in a scrubbing zone to form a warm aqueous liquor containing said fraction, (b) withdrawing the hot liquor from the scrubbing zone, (c) separating from said liquor a sidestream, (d) subjecting said sidestream to fractional distillation by heating to provide the dihydroxybenzene fraction as the bottoms product of the fractional distillation and a first phenol cut as overhead product of the fractional distillation.

(e) introducing the liquor while substantially retaining the heat picked up in the scrubbing zone into a vacuum distillation zone to separate therefrom a second phenol cut, (f) and bringing the liquor fed to the vacuum distillation zone into indirect heat exchange relation with at least one of the fractional distillation products to heat the vacuum distillation feed, and (g) returning the liquor to the scrubbing zone, whereby heat from the coke oven gas imparted to the liquor in the scrubbing zone and heat supplied for the fractional distillation is utilized for distillation in the vacuum distillation zone, and the first and second phenol cuts are obtained to provide said phenol fraction and the fractional distillation provides the dihydroxybenzene fraction as the bottoms thereof.

7. The process of claim 6, wherein the liquor fed to the vacuum distillation zone is brought into indirect heat exchange relation with the overhead of said fractional distillation.

8. The method of claim 6, wherein said sidestream is withdrawn from the liquor fed to the vacuum distillation zone.

9. The method of claim 6, wherein said sidestream is withdrawn from the liquor effluent of said vacuum distillation zone.

10. The method of claim 1, wherein water is added to the liquor to maintain sufficient liquor for the scrubbing while simultaneously making up for water withdrawn with the phenol fraction and dihydroxybenzene fraction.

11. The method of claim 1, wherein an alkaline material is added to the liquor to maintain the pH thereof above about 8.5.

12. The method of claim 1, wherein heat is added to the liquor subsequent to the withdrawal from the scrubbing zone and for use in the vacuum distillation.

13. The method of claim 1, wherein steam is added to the liquor subjected to vacuum distillation, whereby heat is provided for the vacuum distillation and water is added to the liquor.

References Cited by the Examiner
UNITED STATES PATENTS

| | | | |
|---|---|---|---|
| 1,905,108 | 4/33 | Koppers | 260—627 |
| 2,056,748 | 10/36 | Taylor | 260—627 X |
| 2,409,773 | 10/46 | Luten et al. | 202—52 X |
| 2,445,825 | 7/48 | Gollmar | 260—627 |
| 2,451,332 | 10/48 | Green | 202—52 X |
| 2,675,412 | 4/54 | Herbert et al. | 260—627 |
| 2,727,130 | 7/56 | Burns | 202—52 |
| 2,770,576 | 11/56 | Pratt | 202—53 |
| 2,815,389 | 12/57 | Geller et al. | 260—627 |
| 3,043,883 | 7/62 | Thompson | 202—52 X |

FOREIGN PATENTS

| | | |
|---|---|---|
| 880,100 | 12/42 | France. |
| 636,704 | 5/50 | Great Britain. |

References Cited by the Applicant
UNITED STATES PATENTS

| | | |
|---|---|---|
| 1,566,795 | 12/26 | Heffner et al. |
| 1,566,796 | 12/26 | Heffner et al. |
| 1,595,603 | 8/27 | Heffner et al. |
| 1,595,604 | 8/27 | Heffner et al. |
| 1,856,690 | 5/32 | Carswell. |
| 2,056,748 | 10/36 | Taylor. |
| 2,086,856 | 7/37 | Herold et al. |
| 2,381,209 | 8/45 | Cotten. |
| 2,573,244 | 10/51 | Bogart. |
| 2,807,654 | 9/57 | Grimmett et al. |

NORMAN YUDKOFF, *Primary Examiner.*

UNITED STATES PATENT OFFICE
CERTIFICATE OF CORRECTION

Patent No. 3,203,874                              August 31, 1965

Robert L. Somerville

It is hereby certified that error appears in the above numbered patent requiring correction and that the said Letters Patent should read as corrected below:

Column 1, line 19, for "liquid" read -- liquor --; column 8, line 27, for "2,727,130" read -- 2,757,130 --.

Signed and sealed this 22nd day of February 1966.

(SEAL)
Attest:

ERNEST W. SWIDER                             EDWARD J. BRENNER
Attesting Officer                                Commissioner of Patents